(12) United States Patent
Xu et al.

(10) Patent No.: US 10,650,964 B2
(45) Date of Patent: May 12, 2020

(54) COIL MODULE, WIRELESS POWER TRANSMITTING CIRCUIT AND WIRELESS POWER RECEIVING CIRCUIT

(71) Applicant: NINGBO WEIE ELECTRONICS TECHNOLOGY LTD., Ningbo, Zhejiang (CN)

(72) Inventors: Lizhi Xu, Zhejiang (CN); Feng Yu, Zhejiang (CN); Weiyi Feng, Zhejiang (CN)

(73) Assignee: NINGBO WEIE ELECTRONICS TECHNOLOGY LTD., Ningbo (CN)

( * ) Notice: Subject to any disclaimer, the term of this patent is extended or adjusted under 35 U.S.C. 154(b) by 0 days.

(21) Appl. No.: 16/201,599

(22) Filed: Nov. 27, 2018

(65) Prior Publication Data
US 2019/0198239 A1    Jun. 27, 2019

(30) Foreign Application Priority Data
Dec. 25, 2017    (CN) .......................... 2017 1 1422417

(51) Int. Cl.
*H01F 38/14* (2006.01)
*H02J 7/02* (2016.01)
*H02J 50/12* (2016.01)
*H02J 50/70* (2016.01)

(52) U.S. Cl.
CPC ............. *H01F 38/14* (2013.01); *H02J 7/025* (2013.01); *H02J 50/12* (2016.02); *H02J 50/70* (2016.02); *H01F 2038/146* (2013.01)

(58) Field of Classification Search
CPC .... H01F 38/14; H01F 2038/146; H01F 27/40; H01F 27/341; H01F 27/2871; H02J 50/70; H02J 50/12; H02J 7/025; H02J 50/10
See application file for complete search history.

(56) References Cited

U.S. PATENT DOCUMENTS

2017/0324281 A1* 11/2017 Che .......................... H02J 50/12
2019/0312464 A1* 10/2019 Park ........................ H02J 50/12

FOREIGN PATENT DOCUMENTS

| CN | 204480870 U | 7/2015 |
|---|---|---|
| CN | 105845404 A | 8/2016 |
| CN | 106961165 A | 7/2017 |
| CN | 107240963 A | 10/2017 |
| CN | 105845404 B | 12/2017 |
| CN | 107768121 A | 3/2018 |
| CN | 108109831 A | 6/2018 |

\* cited by examiner

*Primary Examiner* — Jared Fureman
*Assistant Examiner* — Michael J Warmflash
(74) *Attorney, Agent, or Firm* — Andrus Intellectual Property Law, LLP (57) ABSTRACT

The present application discloses a coil module, a wireless power transmitting circuit and a wireless power receiving circuit. By overlapping a plurality of coils with each other and arranging matched capacitance between adjacent coils and matched capacitance at the output of the coil module, the coupling inductance is increased, the circulating current caused by parasitic capacitance between overlapped coils is effectively reduced and charging efficiency is improved while the cross-sectional area of the coil is kept constant.

10 Claims, 4 Drawing Sheets

COIL MODULE, WIRELESS POWER TRANSMITTING CIRCUIT AND WIRELESS POWER RECEIVING CIRCUIT

CROSS REFERENCE TO RELATED APPLICATION

The present application claims the priority of the Chinese application No. 201711422417.7 with the title of "COIL MODULE, WIRELESS POWER TRANSMITTING CIRCUIT AND WIRELESS POWER RECEIVING CIRCUIT" filed on Dec. 25, 2017, the entire contents of which are incorporated herein by reference.

TECHNICAL FIELD

The present application relates to power electronic technology, in particularly, to wireless charging technology, and more particularly, to a coil module, a wireless power transmitting circuit and a wireless power receiving circuit.

BACKGROUND

Wireless charging technology can wirelessly transmit power between electronic devices and is therefore widely used in consumer electronics and other types of electronic products. Wireless charging technology usually achieves wireless transmission of the power through mutual electromagnetic coupling between a coil in a wireless power transmitting terminal and a coil in a wireless power receiving terminal.

The wireless power transmitting terminal converts a direct current voltage into an alternating current that generates an alternating magnetic field through the coil in the wireless power transmitting terminal. The wireless power receiving terminal couples to the alternating magnetic field to induce a corresponding alternating voltage that is then converted into a direct current voltage by a rectifying circuit to charge an electronic device. The induced voltage generated by the wireless power receiving terminal coupling to the alternating magnetic field is:

$$U_s = \omega M I_p \text{ (wherein } = k\sqrt{L_p L_s}\text{)}$$

where ω is the frequency of the alternating magnetic field, M is a coupling inductance between a power transmitting coil and a power receiving coil, $I_p$ is the current in the power transmitting coil which characterizes the intensity of the magnetic field, Lp is an inductance value of the power transmitting coil, Ls is an inductance value of the power receiving coil and k is a coupling coefficient between the power transmitting coil and the power receiving coil.

Figure 1:
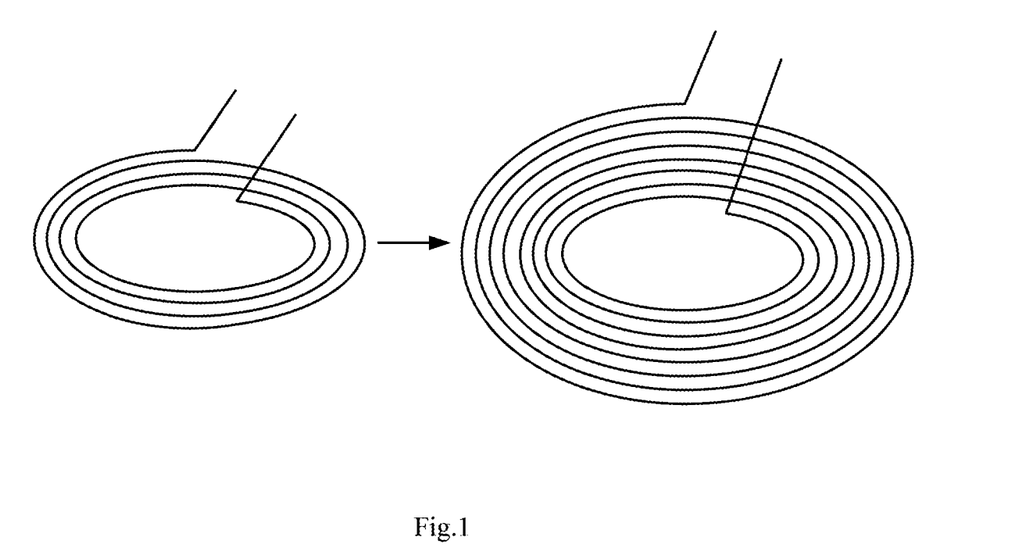
FIG. 1 is a structural diagram of a prior art coil module.

It can be known from the above equation that the induced voltage at the wireless power receiving terminal can be increased by increasing the coupling inductance M. The coupling inductance M can be increased by increasing the inductance value of the power transmitting coil, the inductance value of the power receiving coil or the coupling coefficient between the power transmitting coil and the power receiving coil. The inductance values and coupling coefficient of the coils can be increased by increasing the number of turns of the coils (the inductance value of the coil is directly proportional to the square of the number of turns). As shown in FIG. 1, the number of turns of the coil is increased from 4 to 8 in the same plane. In this way, the number of turns is increased by 2 times and the inductance value is increased by nearly 4 times. However, increasing the number of turns of the coil in the same plane will increase the area of the coil. If the area of the power transmitting coil and the area of the power receiving coil do not correspond to each other after increasing the number of turns of the coils, it will result in an increase in relative proportion of the area of the power transmitting coil and the area of the power receiving coil, and thus resulting in a decrease in the coupling coefficient k and thus a lower charging efficiency.

SUMMARY

In view of this, the present application discloses a coil module, a wireless power transmitting circuit and a wireless power receiving circuit so as to increase coupling inductance, reduce circulating current caused by parasitic capacitance and improve charging efficiency while keeping the cross-sectional area of the coil constant.

In a first aspect of the present application, a coil module is provided which includes: N coils wound in a planar manner and overlapped with each other; N−1 first capacitances, the i-th first capacitance is disposed between the i-th coil and the i+1-th coil to form a series circuit of N coils and N−1 capacitances, wherein i=1 to N−1 and N is greater than or equal to 2; and a second capacitance connected in series at one end of the series circuit of the N coils and the N−1 capacitances.

Further, the configuration parameters of the N capacitances minimize a voltage difference between adjacent two layers of coils.

Further, the inductance value of each of the N coils is L/N, and both the capacitance value of each of the N−1 first capacitances and the capacitance value of the second capacitance are N*C; and
wherein $$j\omega L + \frac{1}{j\omega C} = 0$$

Further, the N coils have the same size and shape.
Further, the N coils are disposed one above the other in a concentric manner.
Further, the coil module further includes: a third capacitance connected in series at the other end of the series circuit of the N coils and N−1 capacitances.
Further, the capacitance value of each of the N−1 first capacitances is N*C, and both the capacitance value of the second capacitance and the capacitance value of the third capacitance are 2N*C.
Further, the coil module further includes: a magnetic sheet disposed on a side of one of the N coils.

In a second aspect of the present application, a wireless power transmitting circuit adapted to wirelessly transmit power is provided, wherein the wireless power transmitting circuit includes the coil module as described above.

In a third aspect of the present application, a wireless power receiving circuit adapted to wirelessly receive power is provided, wherein the wireless power receiving circuit includes the coil module as described above.

In the embodiment of the present application, by overlapping a plurality of coils with each other and arranging matched capacitance between adjacent coils and matched capacitance at the output of the coil module, the coupling inductance is increased, the circulating current caused by parasitic capacitance between overlapped coils is effectively reduced and charging efficiency is improved while the cross-sectional area of the coil is kept constant.

BRIEF DESCRIPTION OF THE DRAWINGS

The above and other objects, features and advantages of the present application will become more apparent from the following description of the embodiments of the present application with reference to the accompanying drawings in which.

DETAILED DISCLOSURE

Hereinafter, the present application will be described based on the embodiments. However, the present application is not limited to these embodiments. In the detailed description of the present application hereinafter, some specific details will be described exhaustively. For those skilled in the art, the present application may be thoroughly understood without description of these details. In order to avoid confusing the substance of the present application, known methods, processes, flows, elements and circuits will not be described in detail.

In addition, the skilled in the art should understand the drawings provided here are for illustrative purposes, and the drawings are not necessarily drawn in proportion.

Meanwhile, it should be understood that in the following description, the term "circuit" refers to a conductive loop consisting of at least one component or sub-circuit which are electrically coupled or electromagnetically coupled to each other. When one component/circuit is referred to as being "connected to" another component, or one component/circuit is referred to as being "connected between" two nodes, it can be connected to or coupled to another component directly or with an intermediate component therebetween. The connection between two components can be physical or logical connection, or physical and logical connection. On the contrary, when one component is referred to as being "coupled directly to" or "connected directly to" another component, it means that there is no intermediate component between two components.

Unless explicitly required in the context, the terms "comprise" and "include" and like expressions in the entire description and claims should be interpreted as an inclusive meaning, not an exclusive or exhaustive meaning; in other words, they mean "comprise, but not limited to."

In the description of the present application, it should be understood that the terms "first" and "second" and the like are only for descriptive purposes, and cannot be understood as indicating or implying relative importance. In addition, in the description of the present application, unless otherwise indicated, the meaning of "plural" is two or above.

Figure 2:
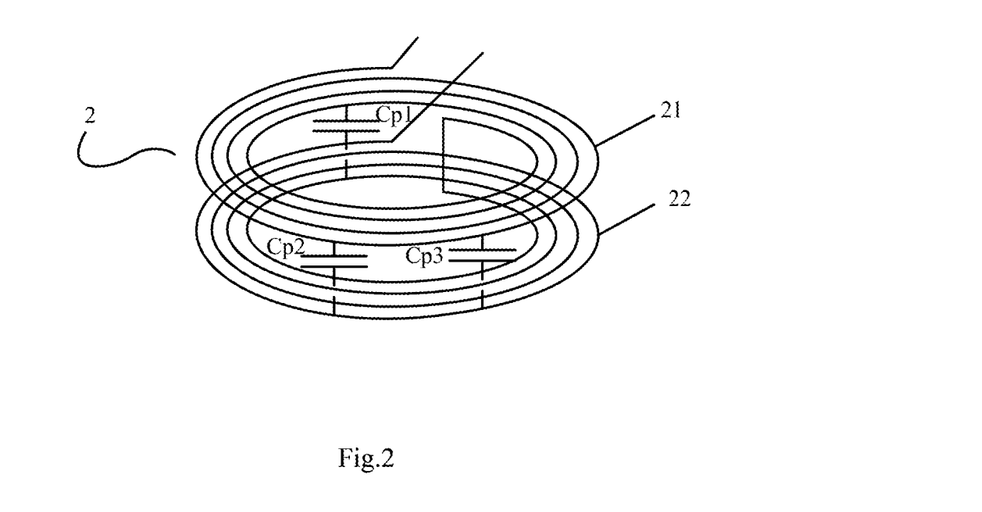
FIG. 2 is a structural diagram of a coil module according to a comparative example of the present application.

FIG. 2 is a structural diagram of a coil module according to a comparative example of the present application. As shown in FIG. 2, the coil module 2 comprises a first coil 21 and a second coil 22. The first coil 21 and the second coil 22 are overlapped one above the other. The number of turns of the first coil 21 and the second coil 22 are both 4 and they are connected in series. Compared to a single coil having 4 turns, the inductance value is increased by approximate 4 times. And the coupling coefficient k is approximately constant while increasing the inductance value of the coil, which makes it more effective to increase the coupling inductance.

However, there will be parasitic capacitances Cp1, Cp2, Cp3 . . . when using the coil module in FIG. 2 to increase the inductance value of the coil, which results in unequal voltages between the upper coil and lower coil and thereby generates parasitic currents $I_{p1}$, $I_{p2}$, $I_{p3}$, . . . through the parasitic capacitances:

$$I_{p1} = C_{p1}\frac{du}{dt}, I_{p2} = C_{p2}\frac{du}{dt}, I_{p3} = C_{p3}\frac{du}{dt}$$

($du$ is the voltage difference between the upper coil and the lower coil)

These parasitic currents will increase reactive power loss in the coil module and reduce charging efficiency. Therefore, the present application provides a coil module in which a plurality of coils are wound in series one above the other to increase the inductance value of the coil module, and at the meanwhile, the parasitic currents caused by the parasitic capacitances between the coils are effectively reduced by arranging an capacitance, which improves charging efficiency.

Figure 3:
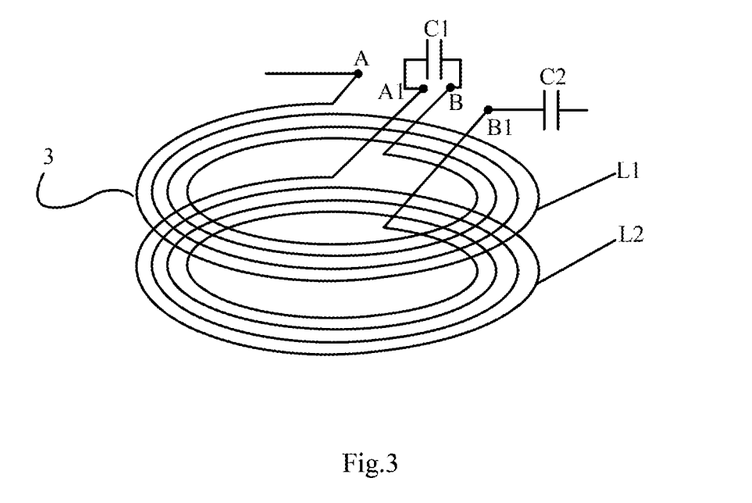
FIG. 3 is a structural diagram of a coil module according to a first embodiment of the present application.
Figure 4:
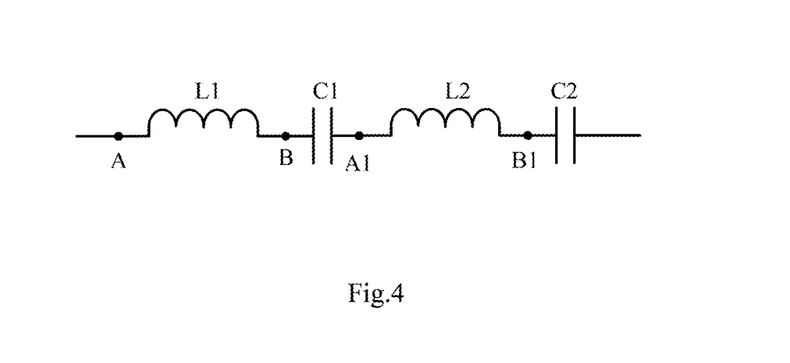
FIG. 4 is an equivalent circuit diagram of the coil module according to the first embodiment of the present application.

FIG. 3 is a structural diagram of a coil module according to a first embodiment of the present application and FIG. 4 is an equivalent circuit diagram of the coil module according to the first embodiment of the present application. As shown in FIG. 3, the coil module 3 comprises a first coil L1, a second coil L2, a first capacitance C1 and a second capacitance C2. The first coil L1 and the second coil L2 are overlapped one above the other and are connected in series. Two ends of the first coil are end A and end B respectively and two ends of the second coil are end A1 and end B1 respectively. The first capacitance C1 is connected in series between the end B of the first coil L1 and the end A1 of the second coil L2. The second capacitance C2 is connected in series with the end B1 of the second coil L2. It should be understood that the second capacitance C2 may also be connected in series with the end A of the first coil L1.

In one embodiment, the first coil L1 and the second coil L2 have the same size and shape so that the magnetic field distribution is uniform.

In one embodiment, the first coil L1 and the second coil L2 are disposed one above the other in a concentric manner so that the induced voltages at corresponding parts of the upper coil and the lower coils are approximately equal and the loss is reduced.

The equivalent circuit diagram of the coil module 3 is as shown in FIG. 4. The first coil L1 and the second coil L2 are resonant with the first capacitance C1 and the second capacitance C2 at an frequency near the operating frequency w to improve power transmission efficiency, i.e., $$j\omega L + \frac{1}{j\omega C} = 0$$

The inductance value of the first coil L1 and the inductance value of the second coil L2 are configured as L1=L2=L/2. In order to eliminate voltage difference between the first coil L1 and the second coil L2, the capacitance value of the first capacitance C1 and the capacitance value of the second capacitance C2 are configured as C1=C2=2C. According to the equivalent circuit diagram shown in FIG. 4, at this time:

the voltage at the end $A$ is $V_A = 0$;

the voltage at the end $B$ is $V_B = I_p j\omega \frac{L}{2} = -I_p \frac{1}{j\omega 2C}$;

the voltage at the end $A1$ is $$V_{A1} = V_B + I_p \frac{1}{j\omega 2C} = -I_p \frac{1}{j\omega 2C} + I_p \frac{1}{j\omega 2C} = 0;$$

the voltage at the end $B1$ is $$V_{B1} = V_{A1} + I_p j\omega \frac{L}{2} = 0 + I_p j\omega \frac{L}{2} = -I_p \frac{1}{j\omega 2C}.$$

It can be known from the above equations that the voltage at the end A of the first coil L1 is consistently equal to the voltage at the end A1 of the second coil L2. The voltage at the end B of the first coil L1 is c consistently equal to the voltage at the end B1 of the second coil L2. It thus can be known that the voltage at each point of the first coil of the upper layer is consistent with the voltage at each corresponding point of the second coil L2 of the lower layer. Therefore, in the coil module 3, there is no voltage jump between the first coil L1 of the upper layer and the second coil L2 of the lower layer, which does not result in a circulating current, reduces the reactive power loss and improves power transmission efficiency.

In one embodiment, the coil module 3 may further comprise a magnetic sheet disposed on a side of the first coil L1 or the second coil L2 to further increase the inductance value of the coil module.

It should be understood that the coil and capacitance can be added to meet actual needs of power transmission when larger coupling inductance is needed, that is, a plurality of (greater than two) coils and capacitances are connected and arranged in a similar manner to the connection manner of the coil module shown in FIG. 3.

Figure 5:
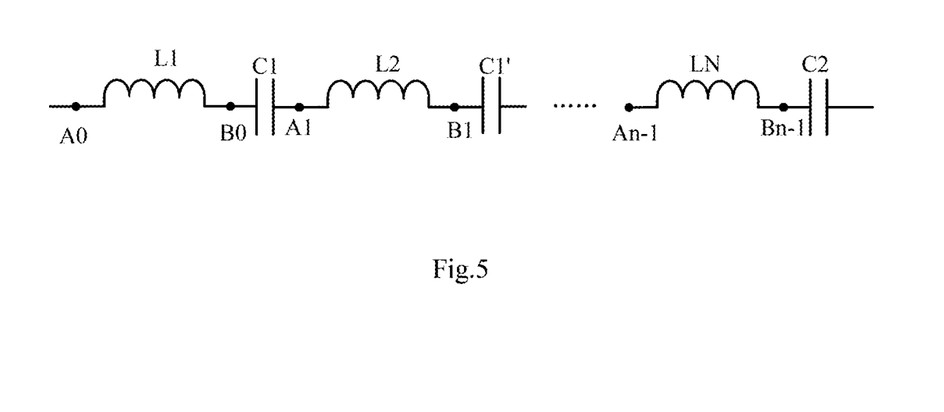
FIG. 5 is an equivalent circuit diagram of another coil module of according to the first embodiment of the present application.

FIG. 5 is an equivalent circuit diagram of another coil module of according to the first embodiment of the present application. As shown in FIG. 5, the coil module comprises N−1 first capacitances C1, C1', ..., a second capacitance C2 and N coils L1-LN, where N is greater than or equal to two. The N coils are wound in a planar manner and overlapped with each other. Two ends of the n-th coil are end An-1 and end Bn-1 respectively, and n=1 to N. The i-th first capacitance is disposed between the i-th coil and the i+1-th coil, i=1 to N−1. The second capacitance C2 is connected in series with the end BN-1 of the N-th coil LN. It should be understood that the second capacitance C2 may also be connected in series with the end A0 of the first coil L1. Let N coils and N capacitances resonate at a frequency near the operating frequency w to improve power transmission efficiency, that is, $$j\omega L + \frac{1}{j\omega C} = 0$$

The inductance value of each of the N coils is Ln=L/N. In order to eliminate voltage difference between upper and lower layers of N coils, the capacitance value of each of the N−1 first capacitances are configured as Ci=N*C, and the capacitance value of the second capacitance is configured as C2=N*C. In the coil module, at this time, the voltages at the end A0 and the end B0 of the first coil L1 and the voltages at the end A1 and the end B1 of the second coil L2 are:

the voltage at the end $A0$ of the first coil $L1$ is $V_{A0} = 0$;

the voltage at the end $B0$ of the first coil $L1$ is $$V_{B0} = I_p j\omega \frac{L}{N} = -I_p \frac{1}{j\omega NC};$$

the voltage at the end $A1$ of the second coil $L2$ is $$V_{A1} = V_{B0} + I_p \frac{1}{j\omega NC} = -I_p \frac{1}{j\omega NC} + I_p \frac{1}{j\omega NC} = 0;$$

the voltage at the end $B1$ of the second coil $L2$ is $$V_{B1} = V_{A1} + I_p j\omega \frac{L}{N} = 0 + I_p j\omega \frac{L}{N} = -I_p \frac{1}{j\omega NC}.$$

It can be known from the above equations that the voltage at each point of the first coil L1 is equal to the voltage at each corresponding point of the second coil L2 and there is no voltage difference. And it can be generalized that the voltage at the end An-1 of the n-th coil in the coil module is 0 and the voltage at the end Bn-1 of the n-th coil in the coil module is $-I_p/j\omega NC$. Therefore, in the coil module having N coils, the voltage difference between every pair of corresponding points of the adjacent upper and lower coils is 0 and there is no voltage jump and no circulating current is caused. This makes it possible to reduce the reactive power loss while increasing the coupling inductance, which increases power transmission efficiency.

It should be understood that in the coil module, two coils disposed adjacently one above the other may be connected adjacently in series at the time of circuit connection (herein, "adjacently" is used to describe the relationship between the coils and a capacitance is connected between adjacent coils in the circuit) and may not be connected adjacently in series. For example, when the first coil, the second coil and the third coil are sequentially overlapped one above the other, the circuit connection manner thereof may be that the first coil and the second coil are connected adjacently in series and the second coil and the third coil are connected adjacently in series. It is also possible that the first coil and the third coil are connected adjacently in series and the third coil and the second coil are connected adjacently in series.

The parameters of the N coils in the coil module may be not identical. However, the voltage difference between the upper and lower layers of the coils is approximately zero by configuring the capacitance value of each capacitance according to the inductance value of each coil, which can achieve the effect of reducing the circulating current.

Figure 6:
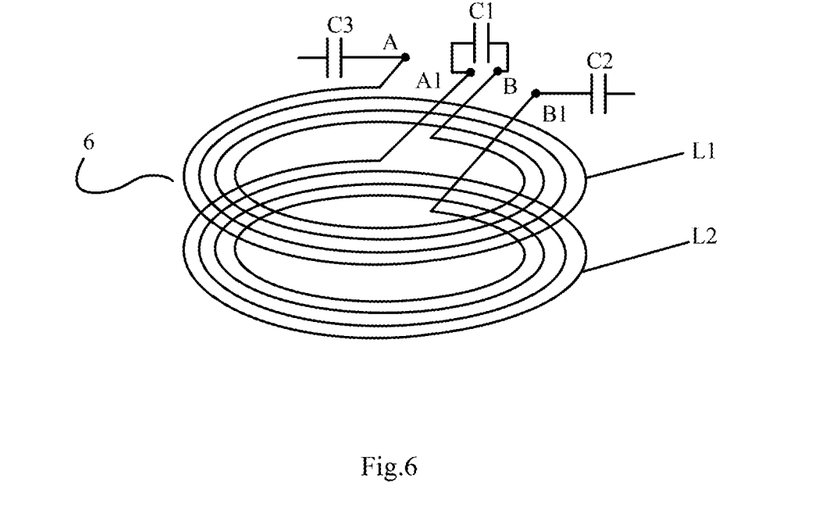
FIG. 6 is a structural diagram of a coil module according to a second embodiment of the present application.
Figure 7:
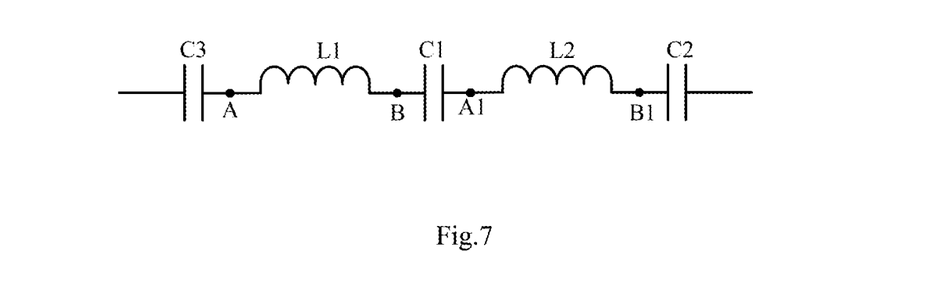
FIG. 7 is an equivalent circuit diagram of the coil module according to the second embodiment of the present application.

FIG. 6 is a structural diagram of a coil module according to a second embodiment of the present application and FIG. 7 is an equivalent circuit diagram of the coil module according to the second embodiment of the present application. As shown in FIG. 6, the coil module 6 comprises a first coil L1, a second coil L2, a first capacitance C1, a second capacitance C2 and a third capacitance C3. The first coil L1 and the second coil L2 are overlapped one above the other and are connected in series. Two ends of the first coil are end A and end B respectively and two ends of the second coil are end A1 and end B1 respectively. The first capacitance C1 is connected in series between the end B of the first coil L1 and the end A1 of the second coil L2. The second capacitance C2 is connected in series with the end B1 of the second coil L2 and the third capacitance C3 is connected in series with the end A of the first coil L1.

In one embodiment, the first coil L1 and the second coil L2 have the same size and shape so that the magnetic field distribution is uniform.

In one embodiment, the first coil L1 and the second coil L2 are disposed one above the other in a concentric manner so that the induced voltages at corresponding parts of the upper coil and the lower coils are approximately equal and the loss is reduced.

The equivalent circuit diagram of the coil module 6 is as shown in FIG. 7. The coil L1 and the coil L2 are resonant with the capacitance C1, the second capacitance C2 and the third capacitance C3 at an frequency near the operating frequency w to improve power transmission efficiency, i.e., $$j\omega L + \frac{1}{j\omega C} = 0$$

The inductance value of the first coil L1 and the inductance value of the second coil L2 are configured as L1=L2=L/2. In order to eliminate voltage difference between the first coil L1 and the second coil L2, the capacitance value of the first capacitance C1 is configured as C1=2C, and the capacitance value of the second capacitance C2 and the capacitance value of the third capacitance C3 are configured as C2=C3=2C. According to the equivalent circuit diagram shown in FIG. 7, at this time:

the voltage at the end $A$ is $V_A = I_P \frac{1}{j\omega 4C}$;

the voltage at the end $B$ is $$V_B = V_A + I_P j\omega \frac{L}{2} = I_P \frac{1}{j\omega 4C} + I_P j\omega \frac{L}{2} = -I_P \frac{1}{j\omega 4C};$$

the voltage at the end $A1$ is $$V_{A1} = V_B + I_P \frac{1}{j\omega 2C} = -I_P \frac{1}{j\omega 4C} + I_P \frac{1}{j\omega 2C} = I_P \frac{1}{j\omega 4C};$$

the voltage at the end $B1$ is $$V_{B1} = V_{A1} + I_P j\omega \frac{L}{2} = I_P \frac{1}{j\omega 4C} + I_P j\omega \frac{L}{2} = -I_P \frac{1}{j\omega 4C}.$$

It can be known from the above equations that the voltage at the end A of the first coil L1 is consistently equal to the voltage at the end A1 of the second coil L2. The voltage at the end B of the first coil L1 is consistently equal to the voltage at the end B1 of the second coil L2. It thus can be known that the voltage at each point of the first coil of the upper layer is consistent with the voltage at each corresponding point of the second coil L2 of the lower layer. Therefore, in the coil module 6, there is no voltage jump between the first coil L1 of the upper layer and the second coil L2 of the lower layer, which does not result in a circulating current, reduces the reactive power loss and improves power transmission efficiency. At the meanwhile, compared to the coil module 3, the maximum voltage value on each coil is reduced and thus reducing the risk of the capacitance being broken down by a high voltage.

In one embodiment, the coil module 3 may further comprise a magnetic sheet disposed on a side of the first coil L1 or the second coil L2 to further increase the inductance value of the coil module.

It should be understood that the coil and capacitance can be added to meet actual needs of power transmission when larger coupling inductance is needed, that is, a plurality of (greater than two) coils and capacitances are connected and arranged in a similar manner to the connection manner of the coil module shown in FIG. 6.

Figure 8:
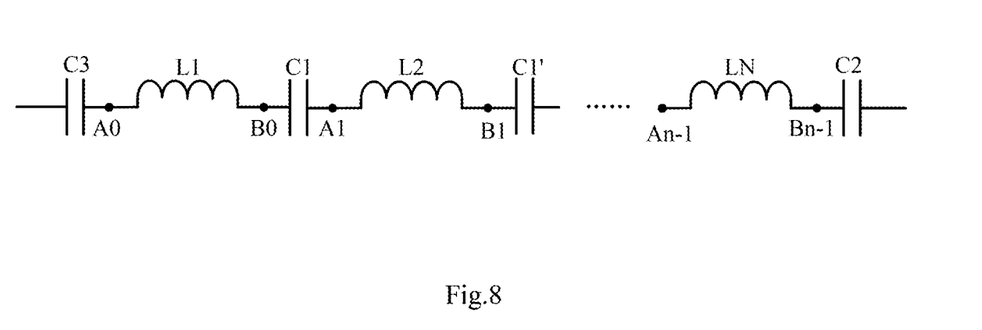
FIG. 8 is an equivalent circuit diagram of another coil module according to the second embodiment of the present application.

FIG. 8 is an equivalent circuit diagram of another coil module of according to the second embodiment of the present application. As shown in FIG. 8, the coil module comprises N coils, N−1 first capacitances C1, C1′, ..., a second capacitance C2 and a third capacitance C3, where N is greater than or equal to two. The N coils are wound in a planar manner and overlapped with each other. Tw ends of the n-th coil are end An-1 and end Bn-1 respectively, and n=1 to N. The i-th first capacitance is disposed between the i-th coil and the i+1-th coil, i=1 to N−1. The second capacitance C2 is connected in series with the end BN-1 of the N-th coil LN. The third capacitance C3 is connected in series with the end A0 of the first coil L1. Let N coils and N+1 capacitances resonate at a frequency near the operating frequency w to improve power transmission efficiency, that is, $$j\omega L + \frac{1}{j\omega C} = 0$$

The inductance value of each of the N coils is Ln=L/N. In order to eliminate voltage difference between upper and lower layers of N coils, the capacitance value of each of the N−1 first capacitances are configured as Ci=N*C, and the capacitance value of the second capacitance and the capacitance value of the third capacitance are configured as C2=C3=2N*C. In the coil module, at this time, the voltages at the end A0 and the end B0 of the first coil L1 and the voltages at the end A1 and the end B1 of the second coil L2 are:

the voltage at the end $A0$ of the first coil L1 is $$V_{A0} = I_P \frac{1}{j\omega 2C};$$

the voltage at the end $B0$ of the first coil L1 is $$V_{B0} = V_A + I_P j\omega \frac{L}{N} = I_P \frac{1}{j\omega 2NC} - I_P \frac{1}{j\omega NC} = -I_P \frac{1}{j\omega 2NC};$$

the voltage at the end $A1$ of the second coil L2 is $$V_{A1} = V_{B0} + I_P \frac{1}{j\omega NC} = -I_P \frac{1}{j\omega 2NC} + I_P \frac{1}{j\omega NC} = I_P \frac{1}{j\omega 2NC};$$

-continued the voltage at the end $B1$ of the second coil L2 is $$V_{B1} = V_{A1} + I_p j\omega \frac{L}{N} = I_p \frac{1}{j\omega 2NC} + I_p j\omega \frac{L}{N} = -I_p \frac{1}{j\omega 2NC}.$$

It can be known from the above equations that the voltage at each point of the first coil L1 is equal to the voltage at each corresponding point of the second coil L2 and there is no voltage difference. And it can be generalized that the voltage at the end An-1 of the n-th coil in the coil module is $I_p/j\omega 2NC$ and the voltage at the end Bn-1 of the n-th coil in the coil module is $-I_p/j\omega 2NC$. Therefore, in the coil module having N coils, the voltage difference between every pair of corresponding points of the adjacent upper and lower coils is 0 and there is no voltage jump and no circulating current is caused. This makes it possible to reduce the reactive power loss while increasing the coupling inductance, which increases power transmission efficiency. At the meanwhile, the maximum voltage value on each coil is smaller and thus reducing the risk of the capacitance being broken down by a high voltage.

It should be understood that in the coil module, two coils disposed adjacently one above the other may be connected adjacently in series at the time of circuit connection (herein, "adjacently" is used to describe the relationship between the coils and a capacitance is connected between adjacent coils in the circuit) and may not be connected adjacently in series. For example, when the first coil, the second coil and the third coil are sequentially overlapped one above the other, the circuit connection manner thereof may be that the first coil and the second coil are connected adjacently in series and the second coil and the third coil are connected adjacently in series. It is also possible that the first coil and the third coil are connected adjacently in series and the third coil and the second coil are connected adjacently in series.

The parameters of the N coils in the coil module may be not identical. However, the voltage difference between the upper and lower layers of the coils is approximately zero by configuring the capacitance value of each capacitance according to the inductance value of each coil, which can achieve the effect of reducing the circulating current.

Figure 9:
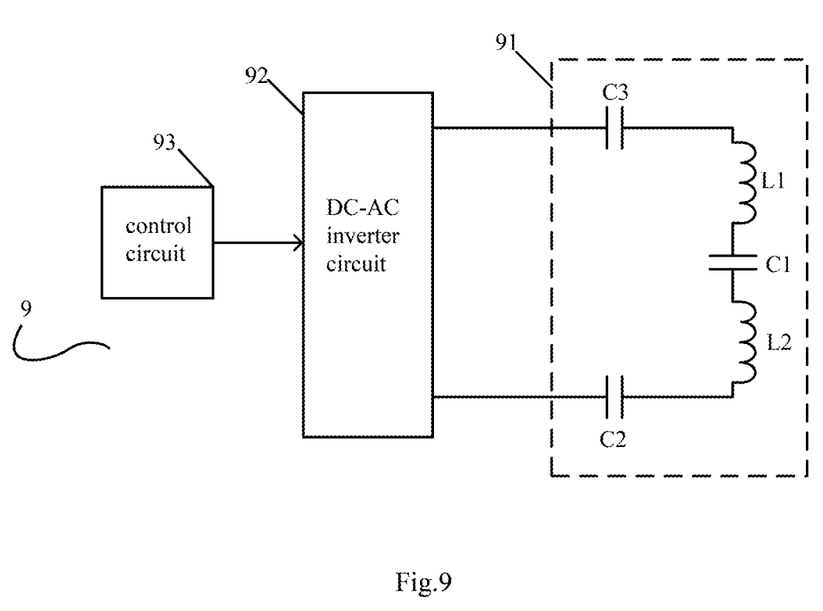
FIG. 9 is a circuit diagram of a wireless power transmitting circuit according to an embodiment of the present application.

FIG. 9 is a circuit diagram of a wireless power transmitting circuit according to an embodiment of the present application. As shown in FIG. 9, the wireless power transmitting circuit 9 comprises a coil module 91, a DC-AC inverter circuit 92 and a control circuit 93. The DC-AC inverter circuit 92 is used to convert an input direct current into an alternating current with an operating frequency of ω, and the control circuit 93 is used to control the DC-AC inverter circuit 92.

Specifically, the coil module 91 comprises a first coil L1, a second coil L2, a first capacitance C1, a second capacitance C2 and a third capacitance C3. Similar to FIG. 6, the first coil L1 and the second coil L2 are overlapped one above the other and are connected in series. The first capacitance C1 is connected in series between the first coil L1 and the second coil L2. The second capacitance C2 is connected with one output of the DC-AC inverter circuit 92 and the third capacitance C3 is connected with the other output of the DC-AC inverter circuit 92. The coils L1 and L2 and the capacitances C1, C2, and C3 resonate at a frequency near the operating frequency w to improve power transmission efficiency. The inductance value of the first coil L1 and the inductance value of the second coil L2 are configured as L1=L2=L/2. In order to eliminate the voltage difference between the first coil L1 and the second coil L2, the capacitance value of the first capacitance C1 is configured as C1=2C, and the capacitance value of the second capacitance and the capacitance value of the third capacitance are configured as C2=C3=4C. This makes the voltage at each point of the first coil of the upper layer be consistent with the voltage at each corresponding point of the second coil L2 of the lower layer. Therefore, there is no voltage jump between the first coil L1 of the upper layer and the second coil L2 of the lower layer, which does not result in a circulating current, reduces the reactive power loss and improves power transmission efficiency. At the meanwhile, the maximum voltage value on each coil is smaller and thus reducing the risk of the capacitance being broken down by a high voltage.

Figure 10:
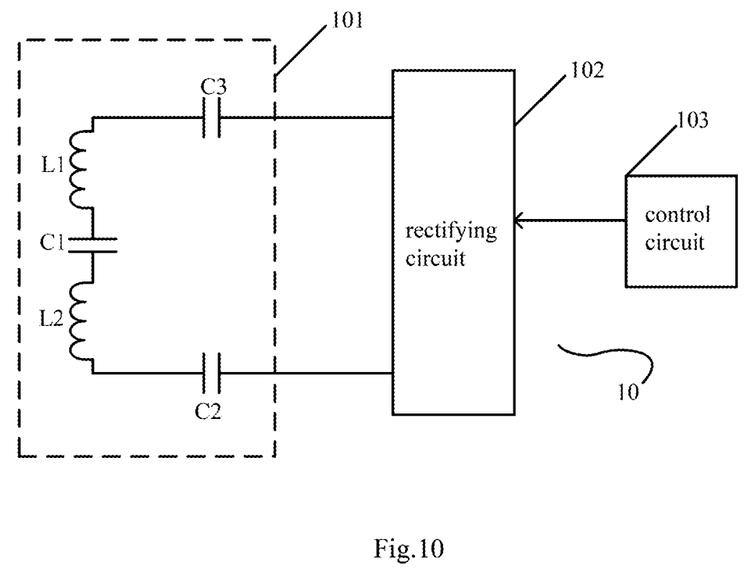
FIG. 10 is a circuit diagram of a wireless power receiving circuit according to an embodiment of the present application.

FIG. 10 is a circuit diagram of a wireless power receiving circuit according to an embodiment of the present application. As shown in FIG. 10, the wireless power receiving circuit 10 comprises a coil module 101, a rectifying circuit 102 and a control circuit 103. The rectifying circuit 102 is used to convert an alternating current received by the wireless power receiving circuit into a direct current output. The control circuit 103 is used to control the rectifying circuit 102.

Specifically, the coil module 101 comprises a first coil L1, a second coil L2, a first capacitance C1, a second capacitance C2 and a third capacitance C3. Similar to FIG. 6, the first coil L1 and the second coil L2 are overlapped one above the other and are connected in series. The first capacitance C1 is connected in series between the first coil L1 and the second coil L2. The second capacitance C2 is connected with one input of the rectifying circuit 102 and the third capacitance C3 is connected with the other input of the rectifying circuit 102. The coils L1 and L2 and the capacitances C1, C2, and C3 resonate at a frequency near the operating frequency w to improve power transmission efficiency. The inductance value of the first coil L1 and the inductance value of the second coil L2 are configured as L1=L2=L/2. In order to eliminate the voltage difference between the first coil L1 and the second coil L2, the capacitance value of the first capacitance C1 is configured as C1=2C, and the capacitance value of the second capacitance and the capacitance value of the third capacitance is configured as C2=C3=4C. This makes the voltage at each point of the first coil of the upper layer be consistent with the voltage at each corresponding point of the second coil L2 of the lower layer. Therefore, there is no voltage jump between the first coil L1 of the upper layer and the second coil L2 of the lower layer, which does not result in a circulating current, reduces the reactive power loss and improves power transmission efficiency. At the meanwhile, the maximum voltage value on each coil is smaller and thus reducing the risk of the capacitance being broken down by a high voltage.

What are described above are only some embodiments of the present application and are not intended to limit the present application. To those skilled in the art, the present application may have various alternations and changes. Any modifications, equivalent replacements and improvements made within the spirit and principle of the present should be included within the protection scope of the present application.

The invention claimed is:

1. A coil module comprising:
   N coils wound in a planar manner and overlapped with each other;
   N−1 first capacitances, the i-th first capacitance is disposed between the i-th coil and the i+1-th coil to form a series circuit of N coils and N−1 capacitances, wherein i=1 to N−1 and N is greater than or equal to 2; and a second capacitance connected in series at one end of the series circuit of the N coils and the N−1 capacitances.

2. The coil module of claim 1, wherein the configuration parameters of the N capacitances minimize a voltage difference between adjacent two layers of coils.

3. The coil module of claim 2, wherein the inductance value of each of the N coils is L/N, and both the capacitance value of each of the N−1 first capacitances and the capacitance value of the second capacitance are N*C; and wherein $$j\omega L + \frac{1}{j\omega C} = 0.$$

4. The coil module of claim 1, wherein the N coils have the same size and shape.

5. The coil module of claim 1, wherein the N coils are disposed one above the other in a concentric manner.

6. The coil module of claim 1, wherein the coil module further comprising:
a third capacitance connected in series at the other end of the series circuit of the N coils and N−1 capacitances.

7. The coil module of claim 6, wherein the capacitance value of each of the N−1 first capacitances is N*C, and both the capacitance value of the second capacitance and the capacitance value of the third capacitance are 2N*C.

8. The coil module of claim 1, wherein the coil module further comprising:
a magnetic sheet disposed on a side of one of the N coils.

9. A wireless power transmitting circuit adapted to wirelessly transmit power, wherein the wireless power transmitting circuit comprises the coil module of claim 1.

10. A wireless power receiving circuit adapted to wirelessly receive power, wherein the wireless power receiving circuit comprises the coil module of claim 1.

* * * * *